(12) United States Patent
Foster et al.

(10) Patent No.: US 8,490,500 B2
(45) Date of Patent: Jul. 23, 2013

(54) TORQUE COEFFICIENT MEASURING DEVICE

(75) Inventors: Eric E. Foster, Morton, IL (US); Robert E. Long, Tremont, IL (US); Boon K. Teh, Peoria, IL (US); Eric R. Jeffery, Peoria, IL (US); Alan H. Doubet, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 234 days.

(21) Appl. No.: 12/973,723

(22) Filed: Dec. 20, 2010

(65) Prior Publication Data

US 2012/0118079 A1 May 17, 2012

Related U.S. Application Data

(60) Provisional application No. 61/414,373, filed on Nov. 16, 2010.

(51) Int. Cl.
*G01L 5/24* (2006.01)

(52) U.S. Cl.
USPC .......................................... 73/862.21; 73/761

(58) Field of Classification Search
USPC .............................................. 73/761, 862.21
See application file for complete search history.

(56) References Cited

U.S. PATENT DOCUMENTS

| | | | |
|---|---|---|---|
| 5,339,696 A | | 8/1994 | Carignan |
| 5,721,380 A | * | 2/1998 | Gozlan ........................... 73/761 |
| 5,821,432 A | * | 10/1998 | Sidler et al. .............. 73/862.043 |
| 6,810,747 B2 | | 11/2004 | Engler et al. |
| 7,260,998 B2 | * | 8/2007 | Madden et al. ................. 73/761 |
| 7,350,419 B2 | * | 4/2008 | Luthje et al. .................... 73/761 |
| 2003/0145657 A1 | * | 8/2003 | Engler et al. .................... 73/761 |

FOREIGN PATENT DOCUMENTS

| | | |
|---|---|---|
| CN | 200947081 Y | 10/2007 |
| EP | 1 609 564 A2 | 12/2005 |
| JP | 60-060525 A | 4/1985 |
| JP | 05-107130 A | 4/1993 |

* cited by examiner

*Primary Examiner* — Freddie Kirkland, III
(74) *Attorney, Agent, or Firm* — Leydig, Voit & Mayer

(57) ABSTRACT

A torque coefficient measuring device can be used to measure an axial load produced by a torque applied to a threaded component which is mounted to the fixture. The measuring device can include a base defining a chamber therein. A load sensor is disposed within the chamber of the base. A movable load pin is housed within the base and arranged such that an axial load placed upon the load pin is transmitted to the load sensor. An attachment member is adapted to be connected with the threaded component. The attachment member is operably arranged with the load pin such that a torque applied to a threaded component mounted to the attachment member places an axial load upon the load pin.

20 Claims, 20 Drawing Sheets

TORQUE COEFFICIENT MEASURING DEVICE

CROSS-REFERENCE TO RELATED APPLICATION

This patent application claims the benefit of priority to U.S. Provisional Patent Application No. 61/414,373, filed Nov. 16, 2010, and entitled "Torque Coefficient Measuring Device," which is incorporated in its entirety herein by this reference.

TECHNICAL FIELD

This patent disclosure relates generally to measuring devices for measuring an axial load and, more particularly, to measuring devices for measuring an axial load in response to an applied torque for use with small-length hose couplings and hydraulic adapters.

BACKGROUND

The torque coefficient K (also referred to herein as the "K factor") is a representation of the friction characteristics of threaded part surfaces. These friction characteristics are a design assumption that relates to the expected clamp load achieved with an applied torque.

The torque coefficient K is calculated using the equation:

$$K=T/(D \times W)$$

where:
K=Torque Coefficient (unitless),
T=Torque applied to the test piece (Nm),
D=Nominal Thread Diameter of the threaded component being tested (mm), and
W=Axial load created at the applied Torque value (kN).

The K factor is typically calculated by applying a known torque and measuring the axial load produced from the applied torque. A conventional technique used to measure the axial load created by the applied torque includes using a donut-shaped load washer that is compressed by the applied torque. The threaded component to be measured—such as a bolt extends through a flat washer, a holding fixture, the instrumented load washer, a second flat washer, and finally a nut. With an assembly in this series, the threaded component to be measured must be a minimum of three inches in length.

Many hydraulic fittings and couplings are less than one inch in length. The axial load created by torque applied to these fittings cannot be directly measured using such a conventional technique, and, thus, the torque coefficient for production parts cannot be defined. Instead, the torque coefficient is inferred by measuring surrogate sample bolts which are plated with the fittings in place of the actual component ultimately used in production.

Chinese Utility Model No. CN 200947081 Y is entitled, "Portable Digital Display Torque Coefficient Tester." The utility model claims a portable digital display torque coefficient tester convenient for use in spot testing the torque coefficient. The tester includes a bracket, an axial force sensor that is fixedly set in the bracket, and a clamping shaft force-transfer mould that is connected to the axial force sensor. One end of the axial force sensor is connected to the clamping shaft force-transfer mould. The other end of the axial force sensor is connected to the bracket. The axial force sensor is connected to a handset meter through a data wire. A torque sensor is connected to the handset meter through a data wire. The tester can directly test the torque coefficient at a job location or on a work piece to harmonize the actual shaft force of the bolt with the designed and requiring shaft force and can directly test the fastening torque value under designed shaft force.

It will be appreciated that this background description has been created by the inventors to aid the reader, and is not to be taken as an indication that any of the indicated problems were themselves appreciated in the art. While the described principles can, in some regards and embodiments, alleviate the problems inherent in other systems, it will be appreciated that the scope of the protected innovation is defined by the attached claims, and not by the ability of any disclosed feature to solve any specific problem noted herein.

SUMMARY

In an embodiment, the present disclosure describes a torque coefficient measuring device that can be used to measure an axial load produced by a torque applied to a threaded component which is mounted to the fixture. In one aspect, an apparatus for measuring an axial load produced by a torque applied to a threaded component can include a base defining a chamber therein. A load sensor is disposed within the chamber of the base. A movable load pin is housed within the base and arranged such that an axial load placed upon the load pin is transmitted to the load sensor. An attachment member is adapted to be connected with the threaded component. The attachment member is operably arranged with the load pin such that a torque applied to a threaded component mounted to the attachment member places an axial load upon the load pin.

In another embodiment, a method for measuring an axial load produced by a torque applied to a threaded component is described. A threaded component is threadedly engaged with a threaded surface of an attachment member such that the threaded component is in axially aligned and engaging relationship with a load pin. A torque is applied to the threaded component such that the threaded component exerts an axial load against the load pin. The load pin, in turn, compressively transmits the axial load to an axial load sensor. The axial load produced by the load pin in response to the torque applied to the threaded component is measured.

In another embodiment of a method for measuring an axial load produced by a torque applied to a threaded component, the threaded component is mounted to a fixture having a movable load pin housed therein. A torque is applied to the mounted threaded component such that the torque applied to the mounted threaded component produces an axial load upon the load pin. The load pin transfers the axial load to a measuring device housed within the fixture.

Further and alternative aspects and features of the disclosed principles will be appreciated from the following detailed description and the accompanying drawings. As will be appreciated, the principles related to measuring devices and methods for measuring an axial load produced by a torque applied to a threaded component disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

DETAILED DESCRIPTION

The amount of axial force imparted to a bolt or coupling during installation varies based upon characteristics, such as, differences in thread geometry (even when the component is within tolerance) and friction. The torque coefficient K is generally specified as a required component characteristic used to ensure that the specified assembly torque results in acceptable product performance.

This disclosure describes methods and fixtures which use a movable load pin in the form of any suitable plunger to transfer the axial load from an applied torque to a load sensor. The load sensor provides a direct measurement of the axial load produced by torque on a coupling or other threaded fitting in order to measure the torque coefficient K. The measured torque coefficient can then be used to set tightening specifications. Advantageously, test fixture constructed in accordance with this disclosure can be used with threaded components that are less than three inches in length.

Using a measuring device in accordance with the present disclosure, a torque can be applied to a threaded component which is installed in a threaded detail plate of the test fixture. The threaded component, in turn, applies an axial force to a movable load pin. The load pin transmits the axial force to a load plate which, in response, compresses a load washer housed within the fixture base. The measuring device provides a means for directly measuring the axial force created by the applied torque. Accordingly, the need for surrogate bolt plating and measurement can be eliminated in instances where the component to be tested would be too small for a conventional measuring device. The measuring device in accordance with the present disclosure can allow for the inspection of production components throughout the supply chain from manufacturer to end user using a common inspection process at all locations.

Figure 1:
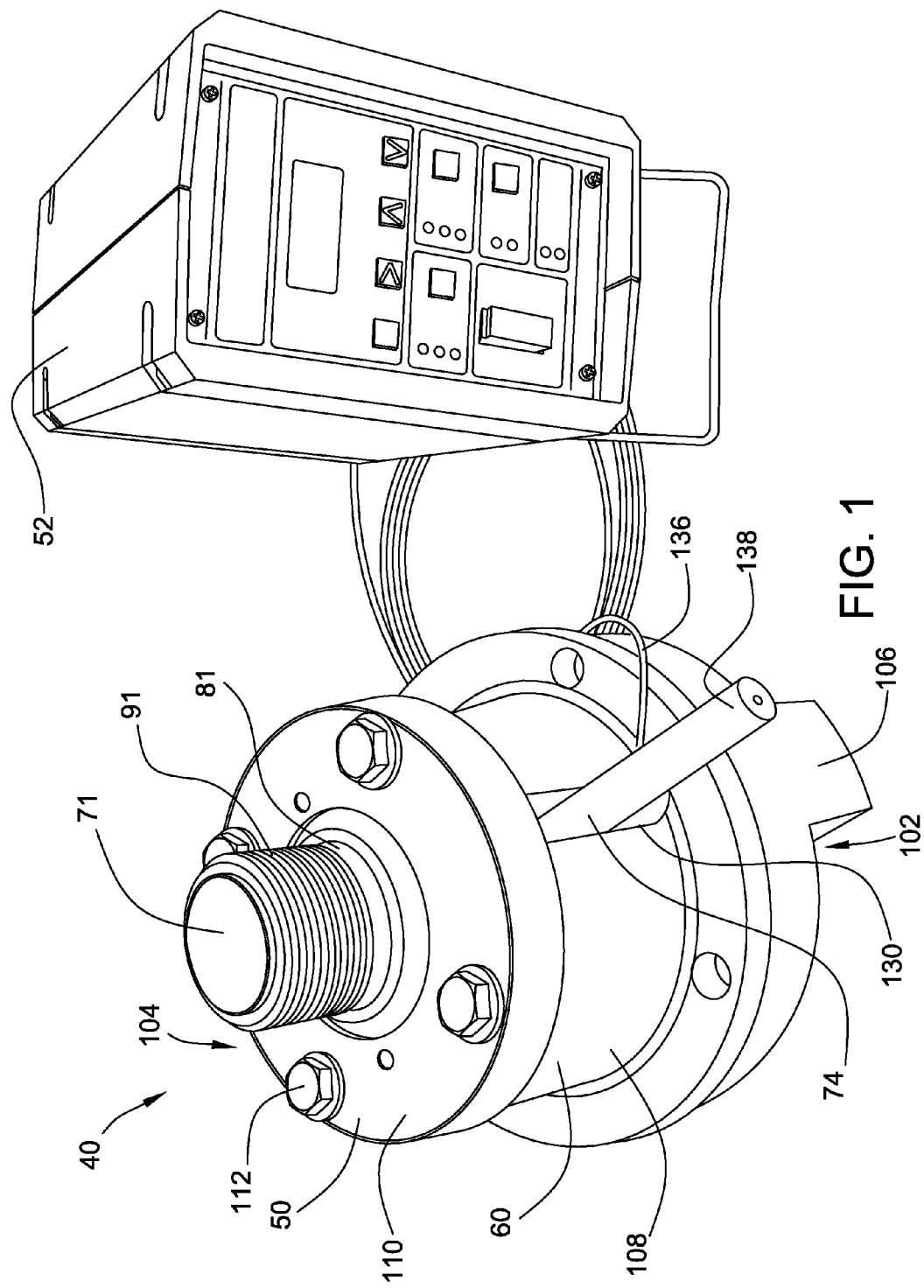
FIG. 1 is a perspective view of an embodiment of a test fixture assembly in accordance with the disclosed principles including an embodiment of a measuring device and a charge amplifier (not to scale).
Figures 31, 32:
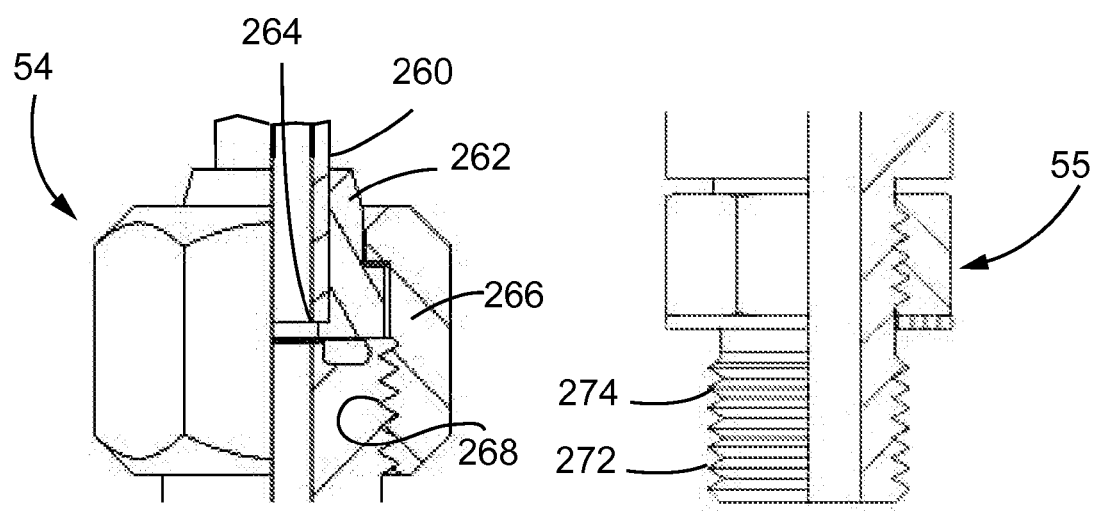
FIG. 31 is an elevational view, partially in section, of an example of a hydraulic fitting having a swivel nut with an internal threaded surface suitable for use with a measuring device constructed in accordance with the present principles and including a threaded attachment member with an external threaded surface.
FIG. 32 is an elevational view, partially in section, of an example of a hydraulic adaptor having a stud end with an external threaded surface suitable for use with a measuring device constructed in accordance with the present principles and including a threaded attachment member with an internal threaded surface.

Turning now to the Figures, there is shown in FIG. 1 an exemplary embodiment of a test fixture assembly 40 including a measuring device 50 operably arranged with a charge amplifier 52. The measuring device 50 can be used to measure an axial load produced by a predetermined torque applied to a threaded component which is mounted to the test fixture assembly 40, such as a hydraulic fitting 54 as shown in FIG. 31 or a hydraulic adaptor 55 as shown in FIG. 32, for example. An example of a charge amplifier 52 suitable for use with a measuring device 50 according to the principles of the present disclosure is a Type 5010 Dual Mode Charge Amplifier, commercially available from Kistler Instrument Corp. of Amherst, N.Y.

Figure 2:
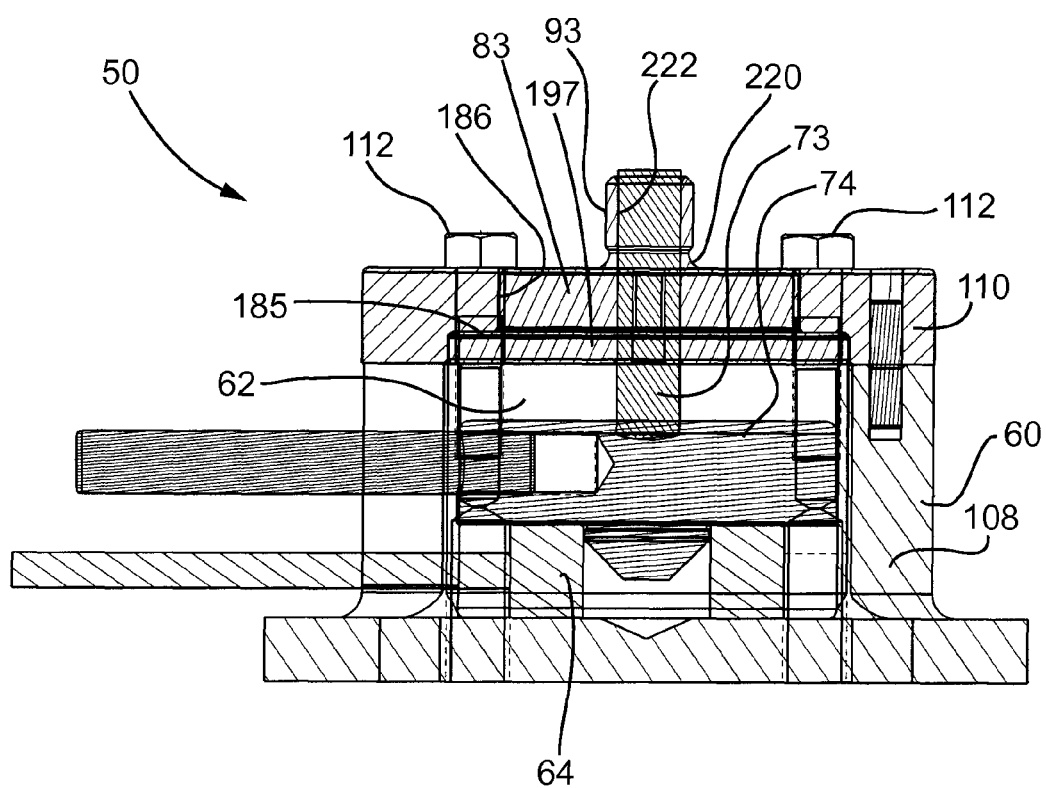
FIG. 2 is an elevational view, in section, of an embodiment of a measuring device in accordance with the disclosed principles, which is similar to the measuring device of FIG. 1 but with an attachment member having a different-sized threaded surface.

Referring to FIGS. 1 and 2, the measuring device 50 can include a fixture base 60 defining a chamber 62 therein; a load sensor 64 disposed within the chamber 62 of the base 60; a plurality of movable load pins 71, 73 interchangeably housed within the base 60 and arranged such that an axial load placed upon the load pin 71, 73 is transmitted to the load sensor 64; a load plate 78 disposed between the load pin 71, 73 and the load sensor 64; and a plurality of attachment members 81, 83 interchangeably supported by the base 60 and adapted to be connected with at least one corresponding threaded component for measuring its torque coefficient K. The measuring device 50 is adapted to be used with one of a plurality of attachment members 81-86 and corresponding load pin 71-76 which can be interchangeably mounted to the base 60 in order to test threaded components of different types and sizes.

Figure 27:
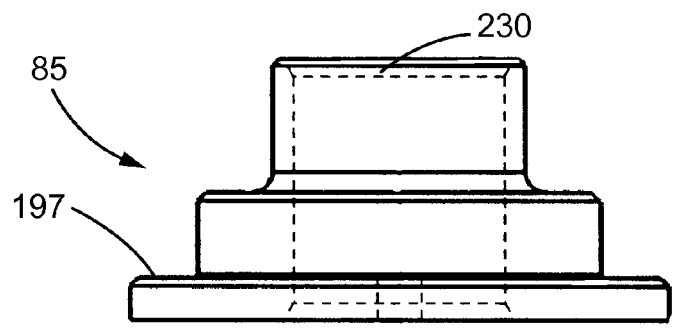
FIG. 27 is an elevational view of another embodiment of a threaded attachment member suitable for use in the measuring device of FIG. 1.
Figure 28:
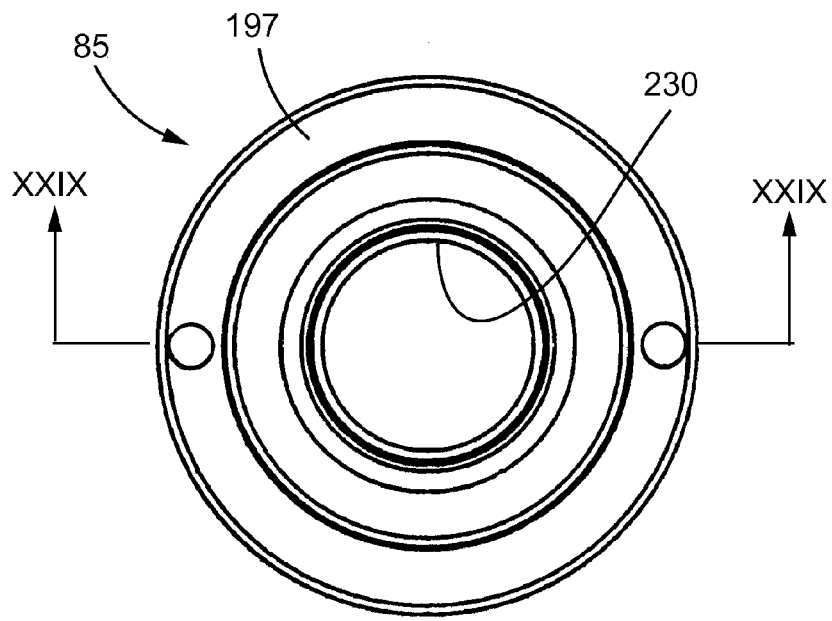
FIG. 28 is a top plan view of the threaded attachment member of FIG. 27.
Figure 29:
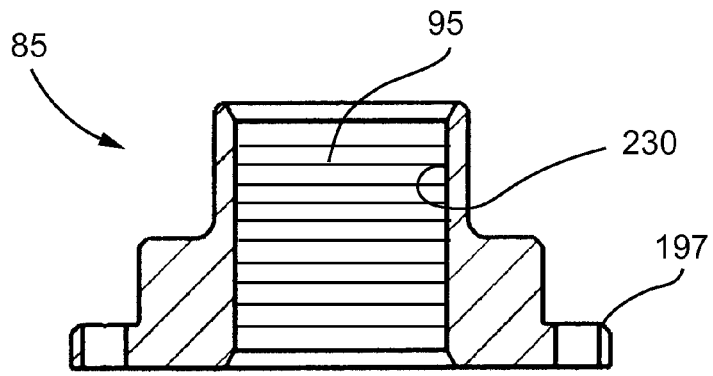
FIG. 29 is a cross-sectional view of the threaded attachment member taken along line XXIX-XXIX in FIG. 28.

For example, the threaded attachment member 81 shown in FIG. 1 includes an external threaded surface 91 having a first size. The threaded attachment member 83 shown in FIG. 2 has an external threaded surface 93 of a second size, which is smaller than the first size. Referring to FIGS. 27-29, another attachment member 85 is shown which includes an internal threaded surface 95 for testing a threaded component with an external threaded surface. The size and shape of the load pin can be varied depending upon the attachment member used and the threaded component sought to be tested.

In some embodiments, the attachment member can include an external threaded surface that is adapted to threadingly engage a hydraulic fitting 54 (see FIG. 31) constructed in accordance with SAE J1453 with an O-ring face seal (ORFS) swivel nut mounted to a flange at a distal end of a tube. In yet other embodiments, the attachment member can include an internal threaded surface adapted to threadingly engage a hydraulic adaptor 55 (see FIG. 32) constructed in accordance with SAE J1926-2 with a straight thread O-ring (STOR) connection. In yet other embodiments, the attachment member can be adapted to threadingly engage other types of adaptors and fittings and other threaded components with either external threaded surfaces or internal threaded surfaces as will be appreciated by one skilled in the art.

Referring to FIG. 1, the base 60 includes a bottom end 102 and a top end 104. The base 60 can include a vise adaptor 106, a housing 108 connected to the vise adaptor 106, and a top plate 110 connected to the housing 108 via a plurality of fasteners 112. The housing 108 is disposed adjacent the bottom end 102 of the base 60 with the vise adaptor 106 below the housing 108 when it is used. The top plate 110 is disposed adjacent the top end 104 of the base 60. The housing 108 and the top plate 110 cooperate together to define the chamber 62 (see FIG. 2).

Figure 3:
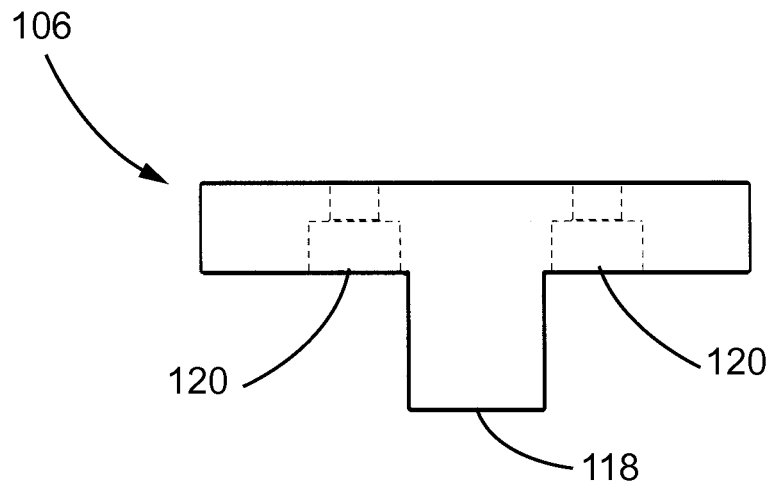
FIG. 3 is an elevational view of a vise adaptor of the measuring device of FIG. 1.
Figure 4:
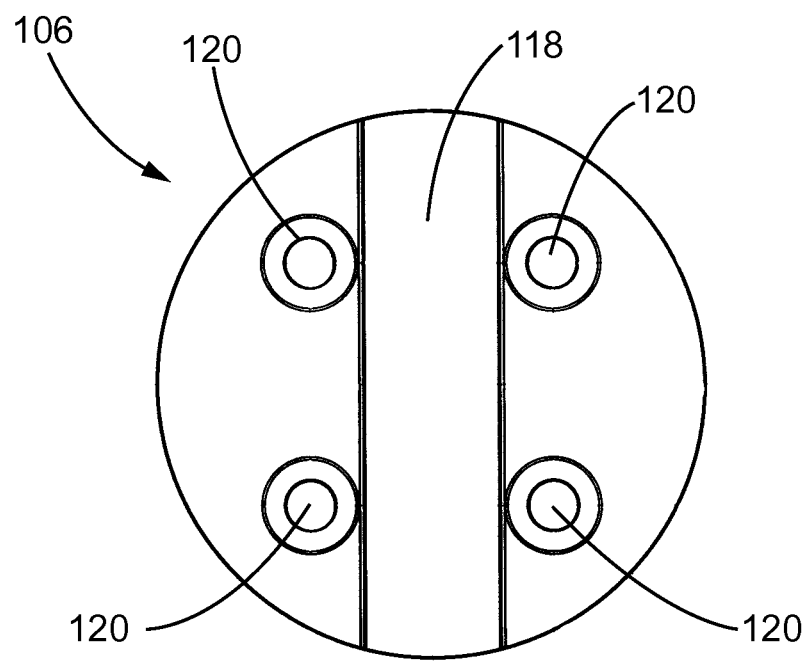
FIG. 4 is a bottom plan view of the vise adaptor of FIG. 3.
Figure 5:
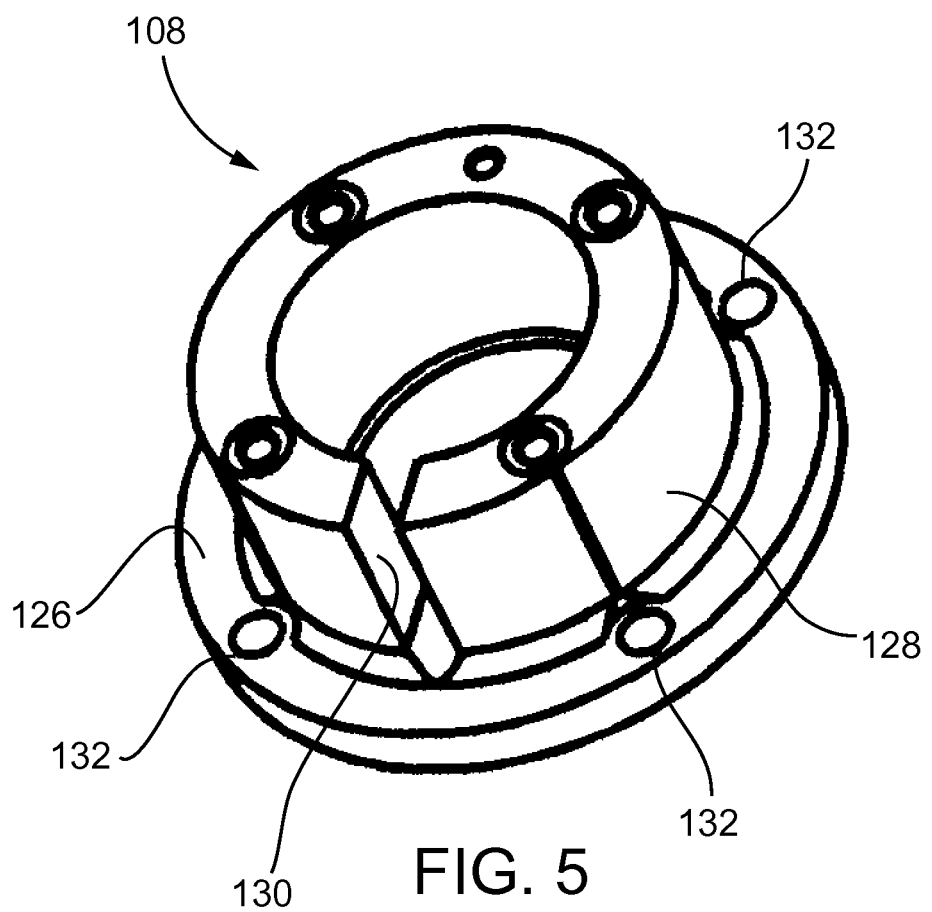
FIG. 5 is a perspective view of a base of the measuring device of FIG. 1.

Referring to FIGS. 3 and 4, the vise adaptor 106 can be provided to allow the base 60 to be clamped into a conventional bench vise. The vise adaptor 106 includes a rib 118 projecting therefrom that is adapted to be clamped in the jaws of a suitable bench vise. The vise adaptor 106 includes a plurality of mounting holes 120 adapted to receive therein a corresponding fastener that can threadingly engage the housing 108 to connect the vise adaptor 106 and the housing 108. The vise adaptor 106 can be made from any suitable material, such aluminum, for example.

Referring to FIGS. 5-8, the housing 108 includes a mounting flange 126 and a generally-cylindrical sidewall 128 having a slot 130 therein. The mounting flange 126 includes a plurality of mounting holes 132 suitable for receiving a corresponding fastener therethrough to mount the housing 108 to a bench top surface, for example. When the housing 108 is secured to a surface using fasteners extending through the mounting holes 132 of the mounting flange 126, the vise adaptor 106 can be omitted. The mounting flange 126 can be sized such that conventional bar clamps can be used to clamp the housing 108 to a work surface.

The housing 108 can be made from any suitable material, such as any suitable tool steel, for example. Preferably, the housing 108 is made from 4140 alloy steel. In yet other embodiments, the housing 108 can be made from any suitable material that yields a small deflection of the housing 108 when under load to provide increased measurement accuracy by helping to ensure that substantially only the load sensor 64 deflects under measurement load.

Figure 9:
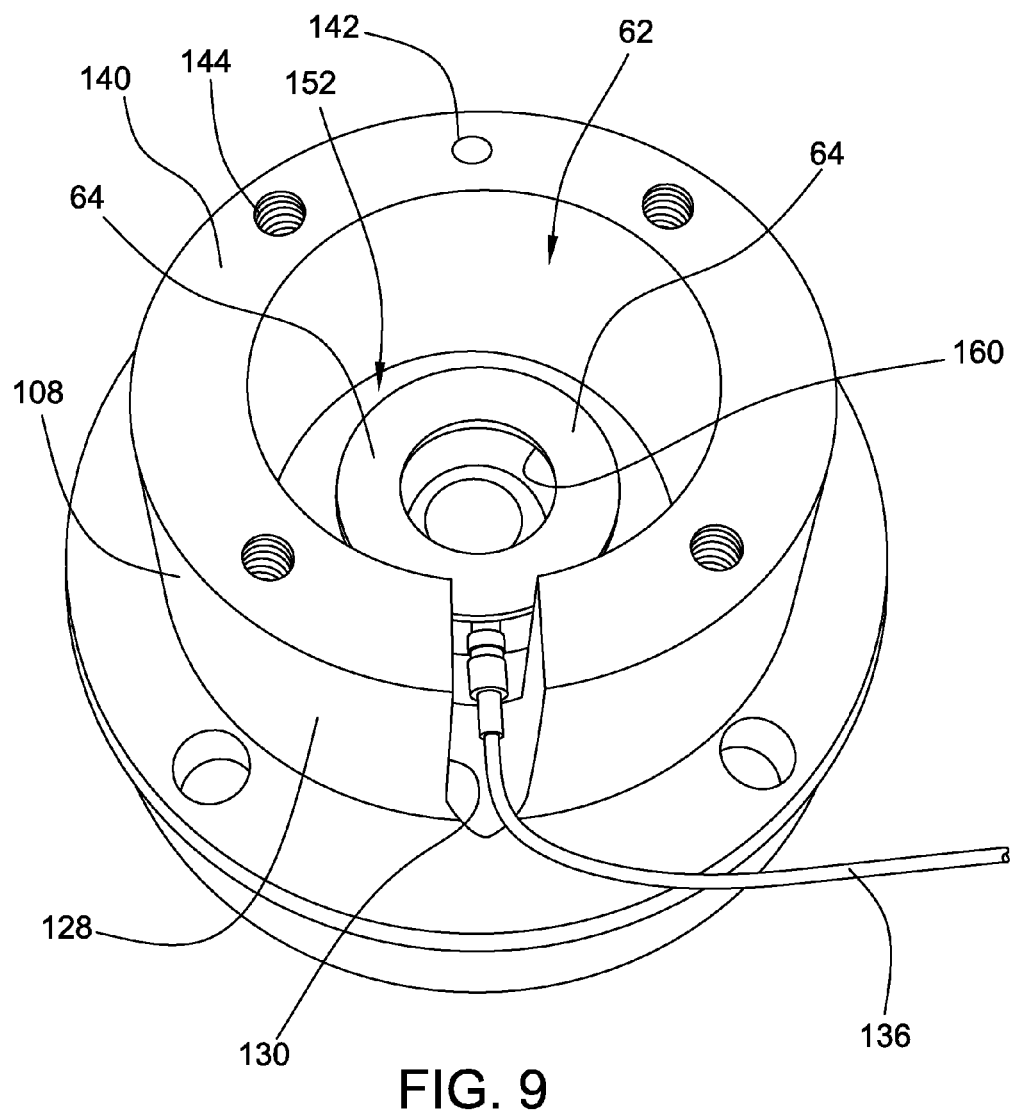
FIG. 9 is a perspective view of the base and a load sensor of the measuring device of FIG. 1.

The slot 130 accommodates a load sensor cable 136 that electronically connects the load sensor 64 and the charge amplifier 52 (or other suitable device for displaying the axial load measured by the load sensor 64) (see FIGS. 1 and 9). The slot 130 is sized to also accommodate a lift pin 138 projecting from the load plate 78 (see FIGS. 1 and 9).

Figure 6:
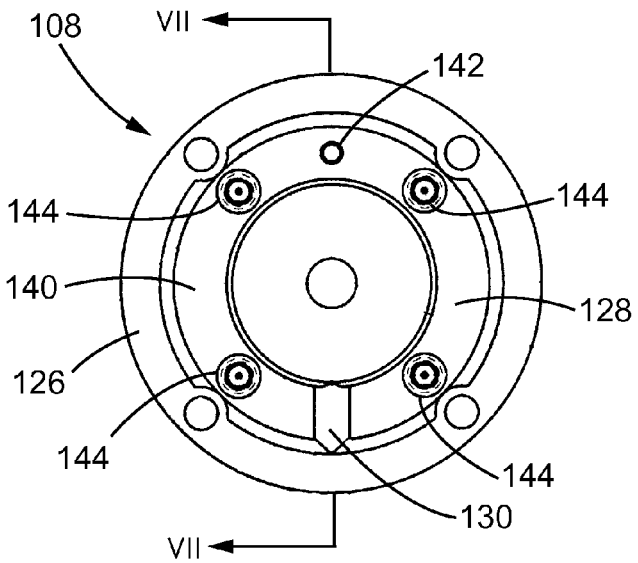
FIG. 6 is a top plan view of the base of FIG. 5.

Referring to FIGS. 6 and 9, the housing 108 has a top plate support surface 140 adapted to support the top plate 110. The top plate support surface 140 defines a locator pin bore 142 extending a predetermined distance therefrom. The top plate support surface 140 also defines a plurality of top plate mounting holes 144 adapted to threadingly receive a corresponding fastener 112 to facilitate the connection of the top plate 110 to the housing 108. The locator pin bore 142 is adapted to accommodate a locator pin 148 extending from the top plate 110 (see FIG. 18) to facilitate the alignment of the top plate 110 with the housing 108 such that the fasteners 112 can extend through the top plate 110 and threadingly engage the top plate mounting holes 144 of the housing 108. The top plate support surface 140 is preferably ground to within a 50 micron flatness and even more preferably to within a 5 micron flatness to help facilitate the efficient transfer of the axial force applied by a threaded component mounted to the test fixture to the load sensor 64.

Figure 7:
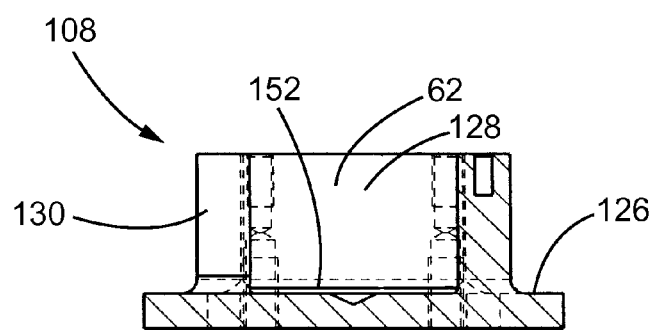
FIG. 7 is a cross-sectional view of the base taken along line VII-VII in FIG. 6.

Referring to FIG. 7, the housing 108 includes a load sensor support surface 152 within the chamber 62 is adapted to support the load sensor 64 thereon. Preferably, the load sensor support surface 152 is ground such that it has a flatness to within 50 microns, and even more preferably to within 5 microns, and has a parallelism within 50 microns, and even more preferably to within 25 microns. The load sensor support surface 152 is preferably finished with the mentioned flatness and parallelism to further facilitate the accurate transfer of measured axial loads by the load sensor 64.

Figure 8:
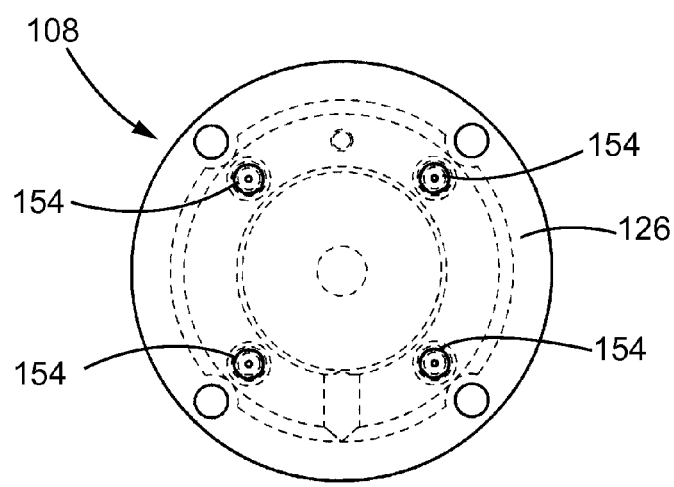
FIG. 8 is a bottom plan view of the base of FIG. 5.

Referring to FIG. 8, the housing 108 includes a plurality of vise adaptor mounting holes 154 extending from a bottom surface 156 thereof. The vise adaptor mounting holes 154 include a threaded surface for threadingly engaging a respective fastener that extends through the corresponding mounting hole 120 in the vise adaptor 106 to connect the housing 108 and the vise adaptor 106 together. The bottom surface 156 of the housing 108 is substantially flat otherwise.

Referring to FIG. 9, the load sensor 64 is disposed within the chamber 62 of the housing 108 with the load sensor cable 136 extending through the slot 130 in the sidewall 128 of the housing 108. The load sensor 64 is disposed upon the load sensor support surface 152 of the housing 108. The illustrated load sensor 64 is in the form of an annular load washer which defines a central inner opening therein. An example of such a load sensor 64 is a piezlolelectric force sensor commercially available from Kistler Instrument Corp. of Amherst, N.Y. In other embodiments, the load sensor 64 can be any suitable force sensor, and the configuration of the fixture base 60 component may be varied in order to accommodate the selected suitable force sensor therein as will be appreciated by those skilled in the art.

Figure 10:
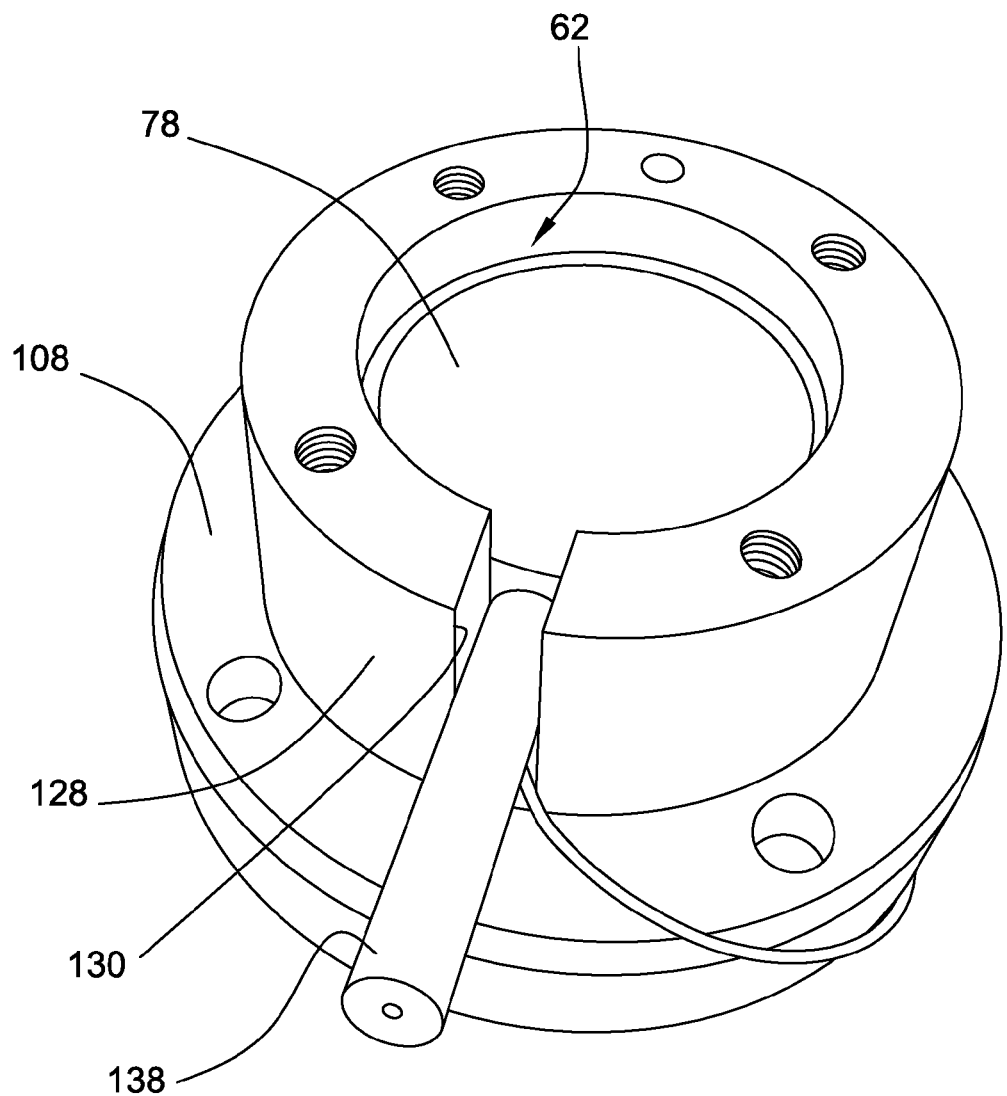
FIG. 10 is a perspective view of the base, the load sensor, and a load plate of the measuring device of FIG. 1.
Figure 11:
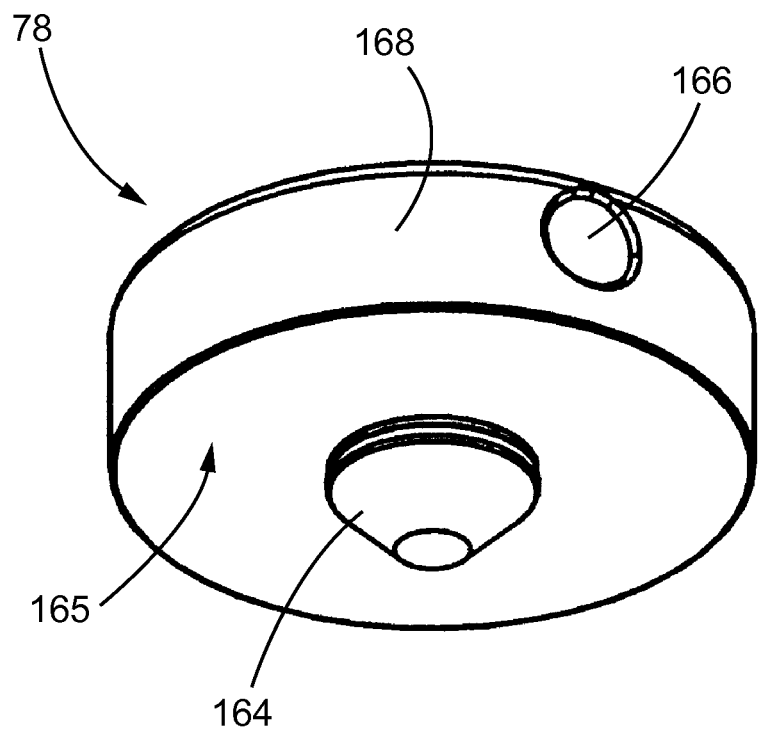
FIG. 11 is a bottom perspective view of the load plate of the measuring device of FIG. 1.
Figure 12:
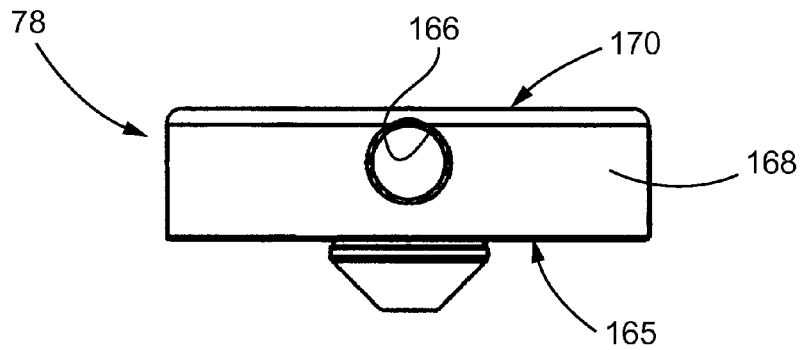
FIG. 12 is an elevational view of the load plate of FIG. 11.
Figure 13:
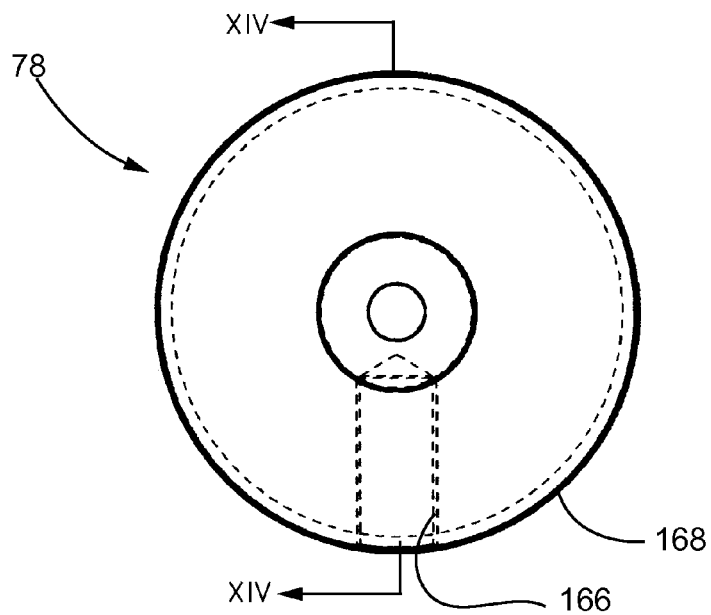
FIG. 13 is a bottom plan view of the load plate of FIG. 11.
Figure 14:
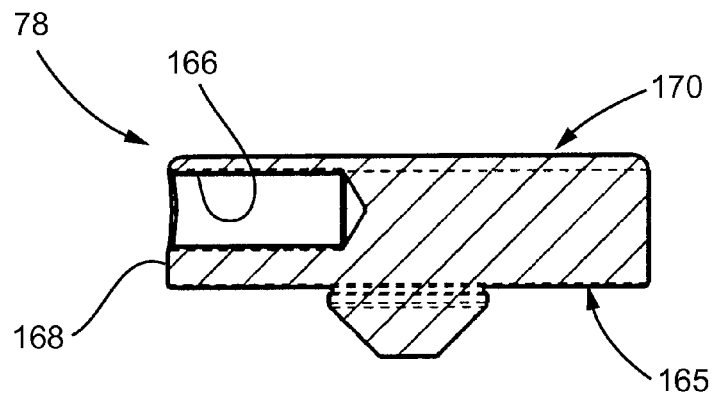
FIG. 14 is a cross-sectional view of the load plate taken along line XIV-XIV in FIG. 13.

Referring to FIG. 10, the load plate 78 is disposed upon the load sensor 64. The lift pin 138 of the load plate 78 extends through the slot 130 of the sidewall 128 of the housing 108. The lift pin 138 can be provided to facilitate the removal of the load plate 78 of the fixture without the need to turn the housing 108 upside down. The load plate 78 is sized such that it closely conforms to the diameter of the chamber 62 within the housing 108 to help limit the range of transverse travel of the load plate 78.

Referring to FIGS. 11-14, the load plate 78 includes a tapered pilot 164 projecting from a load sensor surface 165 thereof. The tapered pilot 164 is a centrally-disposed projection that is sized and adapted to fit within the central inner opening 160 defined by the annular load sensor 64. The tapered pilot 164 provides a loose pilot fit that locates the load plate 78 upon the load sensor 64 such that the load plate 78 is generally centered thereon and constrains the relative transverse translation of the load plate 78 and the load sensor 64 to a limited range of motion defined by the differences in size of the tapered pilot 164 and the central opening of the load sensor 64.

The load plate 78 includes a threaded passage 166 extending from a sidewall surface 168 radially inward. The threaded passage 166 is adapted to threadingly receive the lift pin 138 to secure the lift pin 138 to the load plate 78.

The load plate 78 includes a load pin surface 170 in opposing relationship to the load sensor surface 165. The load pin surface 170 is adapted to support the interchangeable load pins 71-76. The load sensor surface 165 is adapted to engagingly contact the load sensor 64 upon which it rests. Both the load pin surface 170 and the load sensor surface 165 are preferably ground such that they have a flatness to within 50 microns, and even more preferably to within 5 microns. The load sensor surface 165 of the load plate 78 is further preferably ground such that it has a parallelism to within 25 microns of parallel, and more preferably to within 13 microns of parallel.

The load plate 78 can be constructed from any suitable material, such as a suitable tool steel, for example. In one embodiment, the load plate 78 is constructed from A2 steel that has been heat treated to a Rockwell hardness of between about 60 and about 62.

Figure 15:
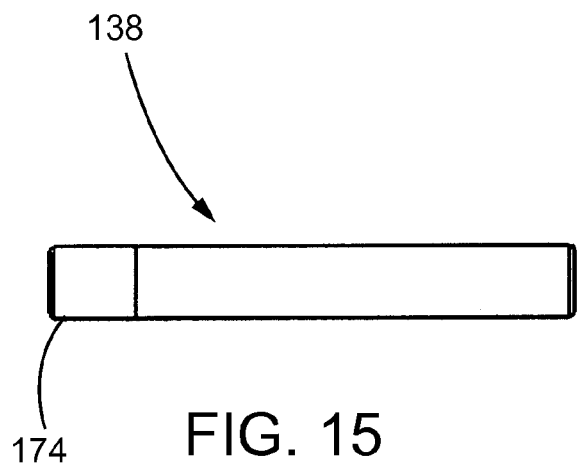
FIG. 15 is an elevational view of a lift pin of the measuring device of FIG. 1.
Figure 16:
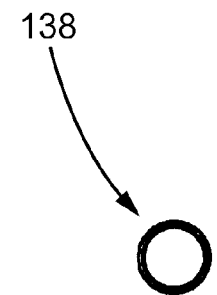
FIG. 16 is an end view of the lift pin of FIG. 15.

Referring to FIGS. 15 and 16, the lift pin 138 is a generally-cylindrical shaft that is sized such that is can extend radially from the load plate 78 through the slot 130 of the housing 108 when the load plate 78 is disposed within the chamber 62. The lift pin 138 includes a threaded end 174 that is adapted to threadingly engage the threaded passage 166 in the load plate 78 to connect the lift pin 138 to the load plate 78.

Figure 17:
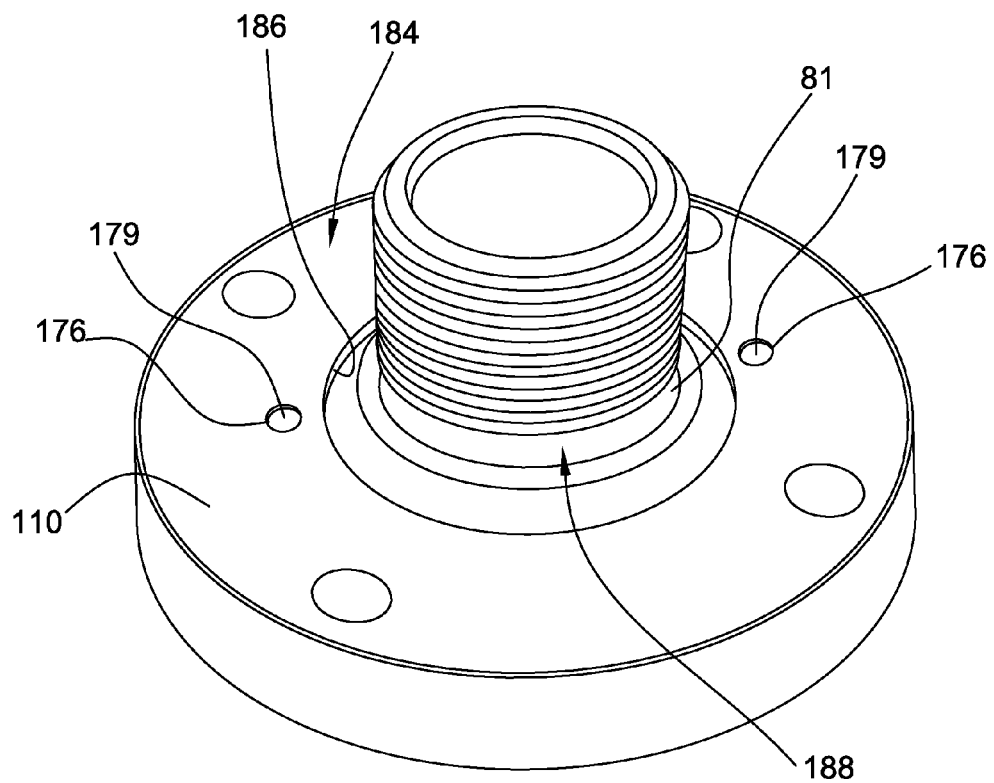
FIG. 17 is a top perspective view of a top plate and a threaded attachment member of the measuring device of FIG. 1.
Figure 18:
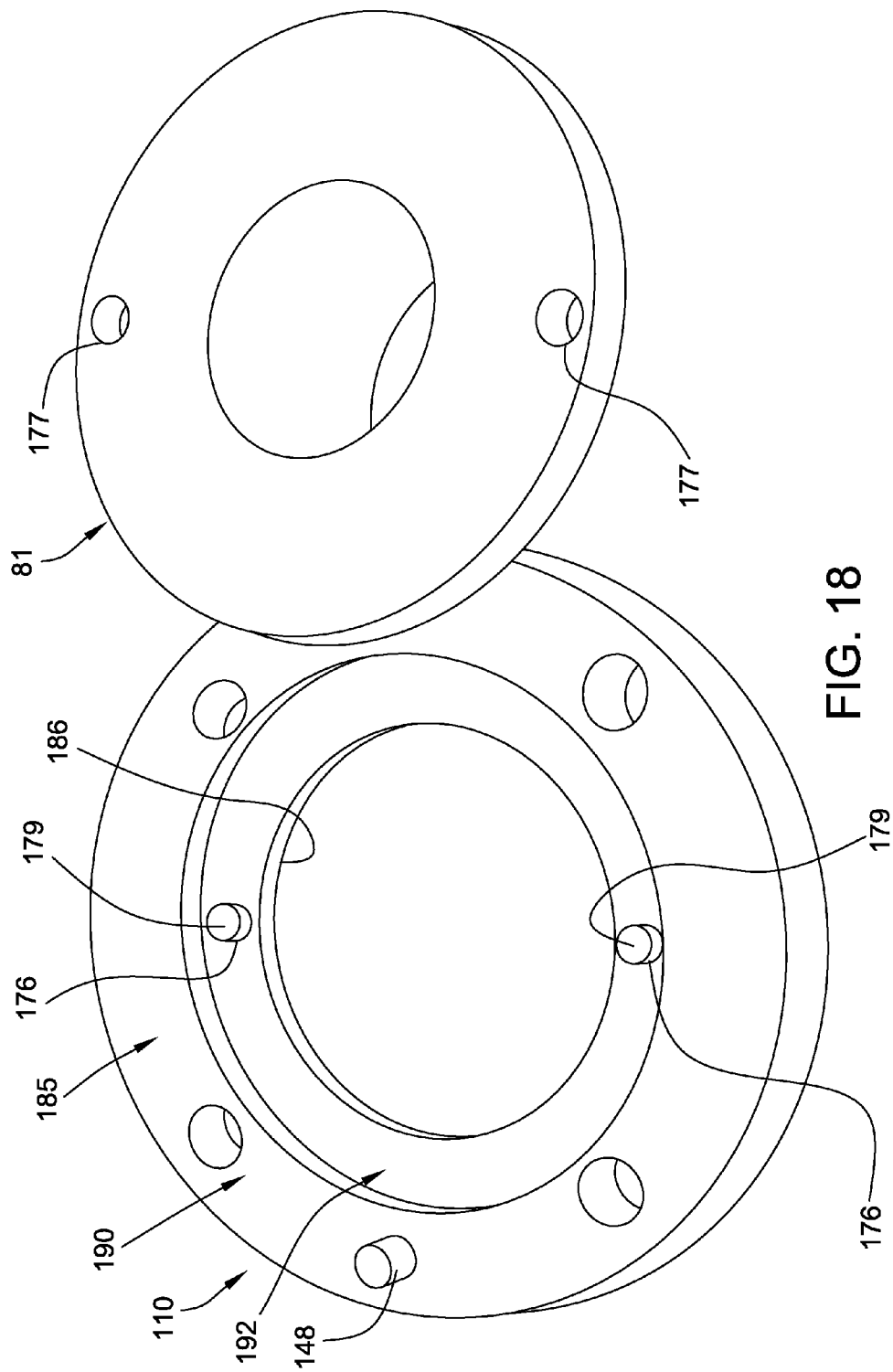
FIG. 18 is a bottom perspective view of the top plate and the threaded attachment member of FIG. 17.

Referring to FIG. 17, the threaded attachment member 81 is mounted to the top plate 110. Referring to FIGS. 17 and 18, the threaded attachment member 81 and the top plate 110 both include a pair of passages 176,177 adapted to accommodate a respective slip-fit anti-rotation pin 179 provided to prevent the attachment member 81 from rotating relative to the top plate 110.

The top plate 110 includes an exterior surface 184 (FIG. 17) and an opposing interior surface 185 (FIG. 18) a central opening 186 extending between the surfaces. The central opening 186 of the top plate 110 is adapted to allow a projecting portion 188 of the attachment member 81 to extend therethrough when the attachment member 81 is assembled to the top plate 110. The interior surface 185 of the top plate 110 helps to define in part the boundary of the chamber 62. The pair of anti-rotation pins 179 projects from the interior surface 185 of the top plate 110.

Referring to FIG. 18, the interior surface 185 of the top plate 110 includes a mating surface 190 adapted to mate with the housing 108 and a pilot surface 192. The locator pin 148 extends from the mating surface 190 of the top plate 110. The locator pin 148 is adapted to fit within the locator pin bore 142 of the housing 108 to facilitate the alignment of the top plate 110 with the housing 108. The anti-rotation pins 179 extend from the pilot surface 192 of the top plate 110. The pilot surface 192 is adapted to closely conform to an outer perimeter 195 of a flange portion 197 of the attachment member 83 (see FIG. 23).

Figure 19:
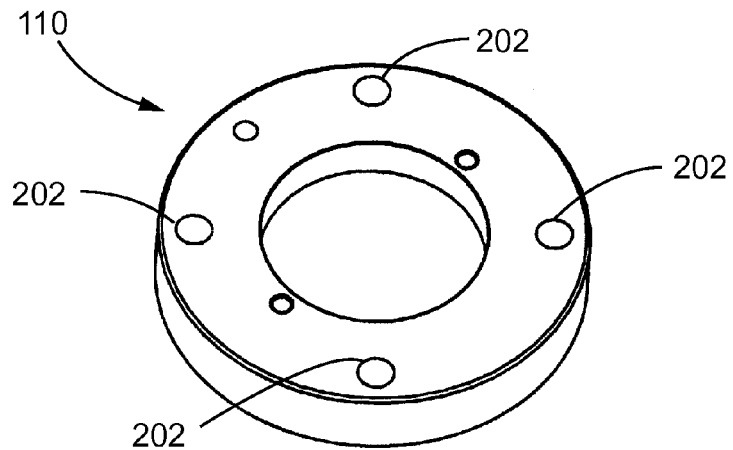
FIG. 19 is a top perspective view of the top plate of FIG. 17.
Figure 20:
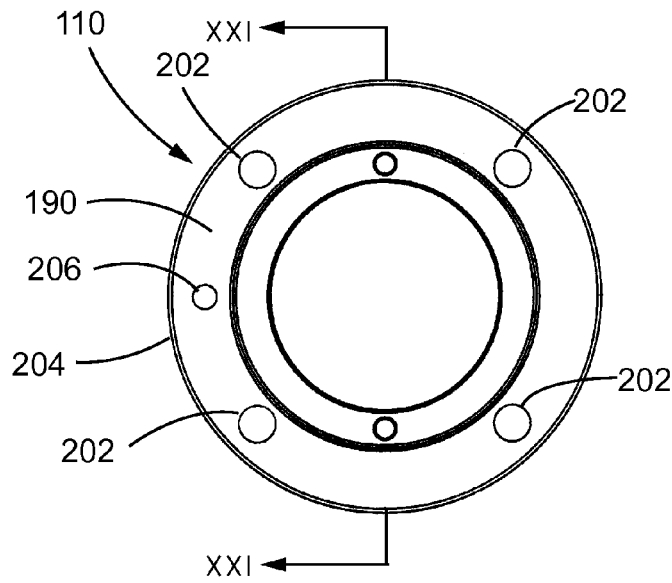
FIG. 20 is a bottom plan view of the top plate of FIG. 17.
Figure 21:
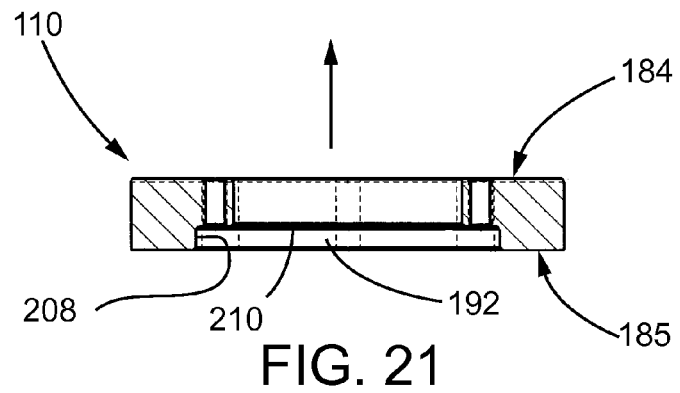
FIG. 21 is a cross-sectional view of the top plate taken along line XXI-XXI in FIG. 20.

Referring to FIGS. 19-21, the top plate 110 functions as a retainer ring that can rotatively retain one of a plurality of interchangeable attachment members 81-86. Referring to FIGS. 19 and 20, the top plate 110 includes a plurality of bores 202 that are adapted to align with the threaded top plate mounting holes 144 of the top plate support surface 140 of the housing 108. An attachment member 83 can be installed on the top plate support surface 140 of the housing 108 and the top plate 110 bolted to the housing 108 to thereby trap the attachment member 83 therebetween (see FIG. 2).

Referring to FIG. 20, the mating surface 190 of the top plate 110 is generally annular and is adjacent an outer perimeter 204 of the top plate 110. The mating surface 190 is adapted to mate with the top plate support surface 140 of the housing 108. The bores 202 of the top plate 110 are disposed within the mating surface 190. The mating surface 190 defines a locator pin bore 206 adapted to receive therein the locator pin 148 extending from the top plate 110 (see FIG. 18). The mating surface 190 is preferably ground such that it has a flatness to within 50 microns, and even more preferably to within a 5 micron flatness.

Referring to FIG. 21, the pilot surface 192 includes a sidewall 208 and a shoulder 210 to provide a stepped configuration that conforms to the shape of the flange portion 197 of each of the interchangeable attachment members 81-86. The anti-rotation pins 179 extend from the shoulder 210 defined by the stepped configuration.

Each attachment member 81-86 can be operably arranged with its corresponding load pin 71-76 such that a torque applied to a threaded component mounted to the attachment member 81-86 places an axial load upon the load pin 71-76. The shoulder 210 of the interior surface 185 of the top plate 110 is configured such that it retentively engages the attachment member 81-86 that is installed in the housing 108 to constrain it from moving in an axial upward direction 214 from the interior surface 185 to the exterior surface 184 of the top plate 110. Accordingly, the particular interchangeable attachment member 81-86 installed in the housing 108 is in inter-engaging relationship with the interior surface 185 of the top plate 110 such that the installed attachment member 81-86 is constrained from moving in the axial upward direction 214.

Figure 22:
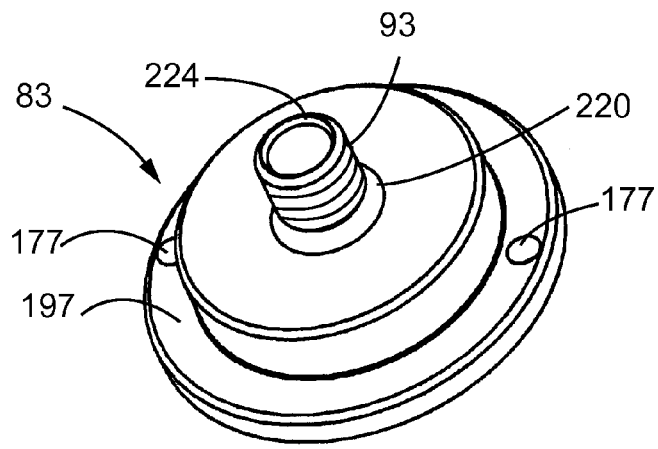
FIG. 22 is a top perspective view of the threaded attachment member of the measuring device of FIG. 2.
Figure 23:
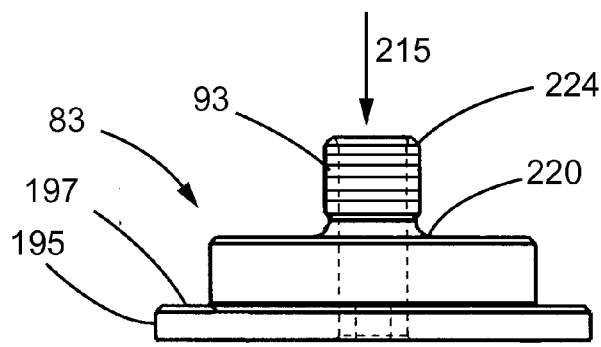
FIG. 23 is an elevational view of the threaded attachment member of the measuring device of FIG. 22.
Figure 24:
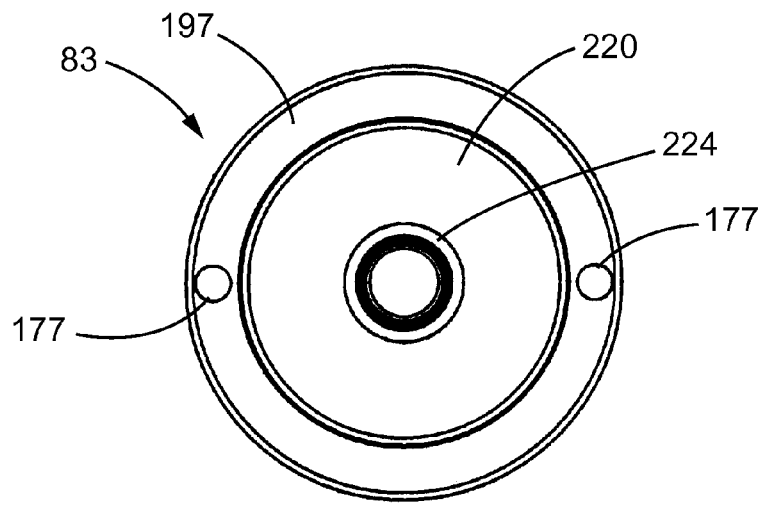
FIG. 24 is a bottom plan view of the threaded attachment member of FIG. 22.

Referring to FIGS. 22-24, the flange portion 197 of the attachment member 83 is adapted to closely conform to the pilot surface 192 of the top plate 110. The flange portion 197 of the attachment member 83 includes the passages 177 that are adapted to accommodate the anti-rotation pins 179 extending from the pilot surface 192 of the top plate 110 to thereby prevent the attachment member 83 from rotating relative to the top plate 110 when it is installed.

The flange portion 197 of the attachment member 83 is sized such that there is an interference fit between the flange portion 197 and the top plate support surface 140 of the housing 108. The interference fit between the flange portion 197 and the housing 108 helps support the attachment member 83 when installed such that the attachment member 83 is constrained from moving in an axial downward direction 215.

When installed, as shown in FIG. 2, the attachment member 83 extends from the interior surface 185 of the top plate 110 through the central opening 186 of the top plate 110. The attachment member 83 includes a stub portion 220 projecting from the flange portion 197. The attachment member includes a centrally-disposed axial passage 222 therethrough that is adapted to accommodate at least a portion of the load pin 73 therein.

In the attachment member illustrated in FIGS. 22-24, the external threaded surface 93 is provided at a distal end 224 of the stub portion 220, which forms the projecting portion 188 when installed in the top plate 110. The external threaded surface 93 is adapted to threadingly engage a threaded component with an internal threaded surface for measuring the torque coefficient K.

Figure 25:
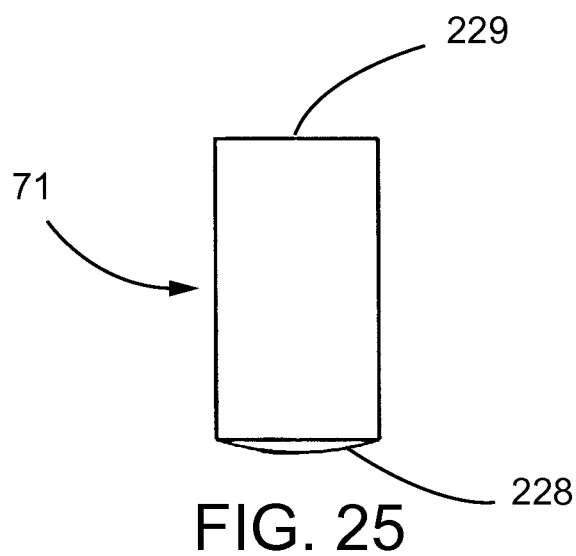
FIG. 25 is an elevational view of a load pin of the measuring device of FIG. 1.
Figure 26:
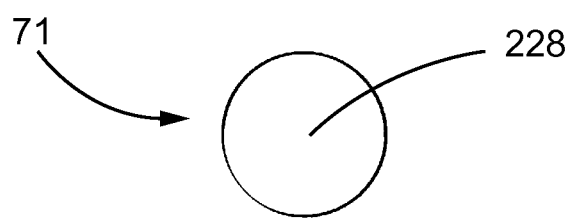
FIG. 26 is a bottom plan view of the load pin of FIG. 25.

Referring to FIGS. 25 and 26, the representative load pin 71 is substantially in the form of a solid cylinder. The load pin 71 includes a pair of opposing ends—a spherical end 228 and a flat end 229. In other embodiments, the load pin 71-76 can be in the form of any suitable load plunger that transfers axial force from a threaded component mounted to an attachment member installed in the housing 108 to the load sensor 64 via the load plate 78.

When installed, the spherical end 228 of the load pin 71 is in engaging contact with the load plate 78. The spherical end 228 of the load pin 71 helps to apply a point load upon the load pin surface 170 of the load plate 78 when the test fixture assembly 40 is testing a threaded component. The flat end 229 of the load pin 71 is adapted for engaging contact with a threaded component that is suitably mounted to the attachment member 81.

In instances where an attachment member with an external threaded surface is used, a load pin is provided that extends a predetermined amount above the distal end 224 of the attachment member such that the threaded component which is being tested on the test fixture can engagingly contact the load pin. In instances where an attachment member with an internal threaded surface is used, a load pin can be provided which can be disposed such that it is in engaging contact with the load plate 78 and does not extend above the distal end 224 of the attachment member.

Referring to FIGS. 27-29, the threaded attachment member 85 includes a centrally-disposed axial passage 230 for the load pin 75. The axial passage 230 of the threaded attachment member 85 includes an internal threaded surface 95 adapted to threadingly engage a threaded component with an external threaded surface. The flange portion 197 of the attachment member 85 is substantially the same size as the flange portion 197 of the attachment member 83 shown in FIGS. 22-24.

The threaded attachment member 85 of FIGS. 27-29 has an internal threaded surface 95 that can be used to test a hydraulic adaptor 55 such as the one shown in FIG. 32, for example. The attachment member 85 of FIGS. 27-29 can be used with a load pin 75 that is sized such that the threaded component being tested can threadingly engage the internal threaded surface 95 of the attachment member 85 with the load pin 75 disposed between the threaded component being tested and the load plate 78 such that the torque applied to the present component being tested applies an axial force upon the load pin 75 which is transmitted to the load plate 78 and ultimately to the load sensor 64 disposed below it.

Figure 30:
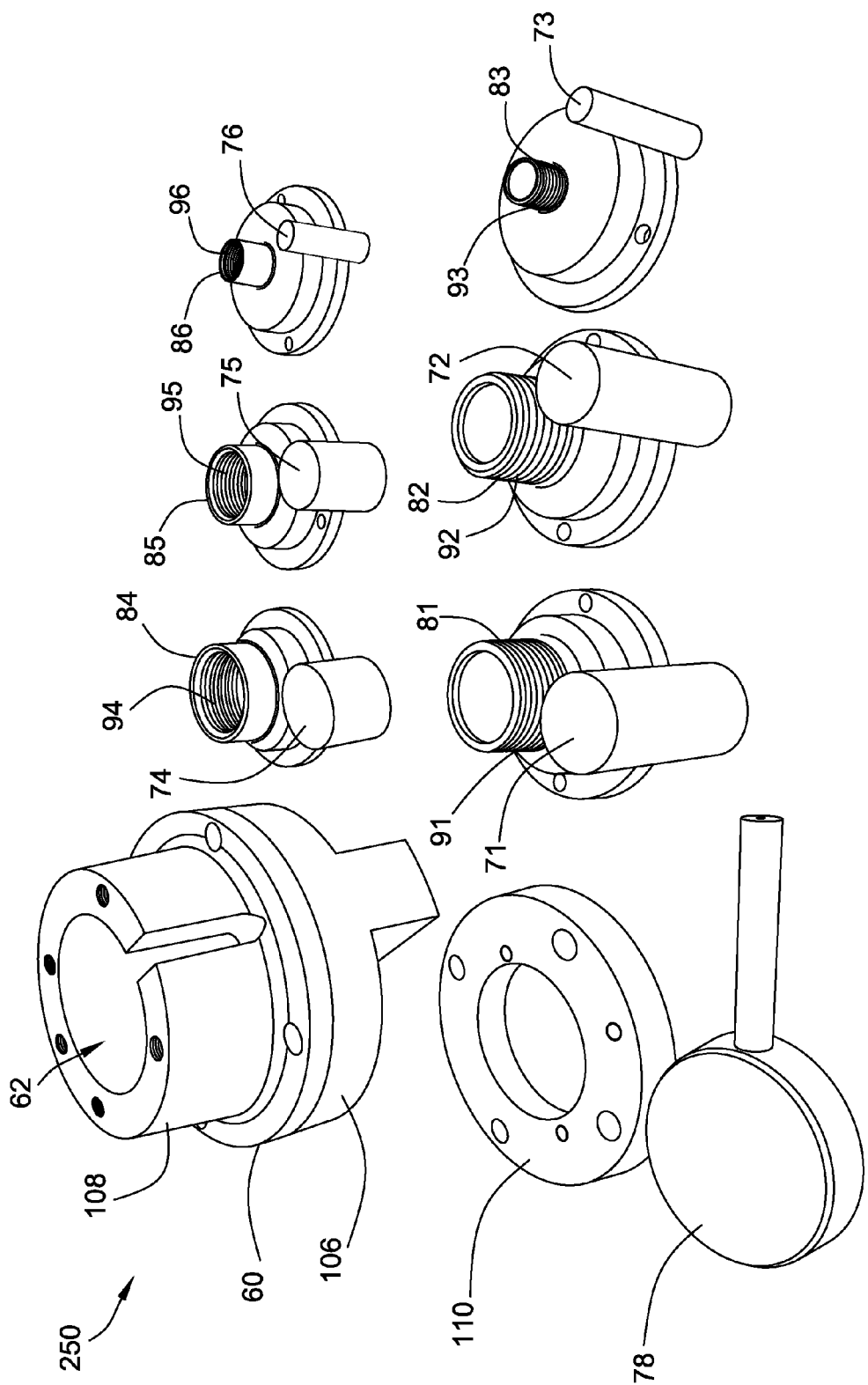
FIG. 30 is a perspective view of an embodiment of a test fixture system in accordance with the disclosed principles.

Referring to FIG. 30, a test fixture system 250 can include a base 60 having a vise adaptor 106, a housing 108, and a top plate 110; a load sensor (not shown), a load plate 78, and a plurality of attachment members 81-86 and corresponding load pins 71-76. The attachment members 81-86 are adapted to interchangeably fit within the chamber 62 of the base 60. The test fixture system 250 can include various other components of the torque coefficient measuring device 50 shown in FIG. 1.

Each attachment member 81-86 can be adapted to be connected with a threaded component of a size that is different than the size of the threaded component(s) with which the other attachment members are adapted to be connected. As shown in FIG. 30, the attachment members 81-86 can include a plurality of attachment members 81-83 having an external threaded surface 91-93 of different sizes and a plurality of attachment members 84-86 with internal threaded surfaces 94-96 of different sizes.

For example, the attachment member designated 81 comprises a first type adapted to be connected with a threaded component of a first size. The attachment member designated 85 comprises a second type adapted to be connected with a second threaded component of a second size, where the second size is different (i.e., smaller) than the first size. The attachment member 81 of the first type and the attachment member 85 of the second type are adapted to be interchangeably supported by the base 60.

Furthermore, the load pin designated 71 comprises a first type adapted for use with the attachment member 81 of the first type. The movable load pin designated 75 comprises a second type which is adapted to be housed within the base 60, interchangeably with respect to the load pin 71 of the first type, and arranged with respect to the second threaded component such that an axial load placed upon the load pin 75 of the second type is transmitted to the load sensor 64.

Referring to FIG. 31, the hydraulic fitting 54 can include a hose 260 having a flange piece 262 mounted to a distal end 264 thereof. A swivel nut 266 is provided over the flange piece 262. The swivel nut 266 includes an internal threaded surface 268 that can be mounted to an external threaded surface 93 of one of the attachment members 83 which is mounted in the housing 108 of the torque coefficient measuring device 50 to determine the torque coefficient K of the hydraulic fitting 54.

Referring to FIG. 32, the hydraulic adaptor 55 includes a stud end 272 having an external threaded surface 274. The external threaded surface 274 of the hydraulic adaptor 55 can be mounted to an internal threaded surface 96 of one of the attachment members 86 of the test fixture system 250 which is itself mounted in the housing 108 to determine the torque coefficient K of the hydraulic adaptor 55.

Figure 33:
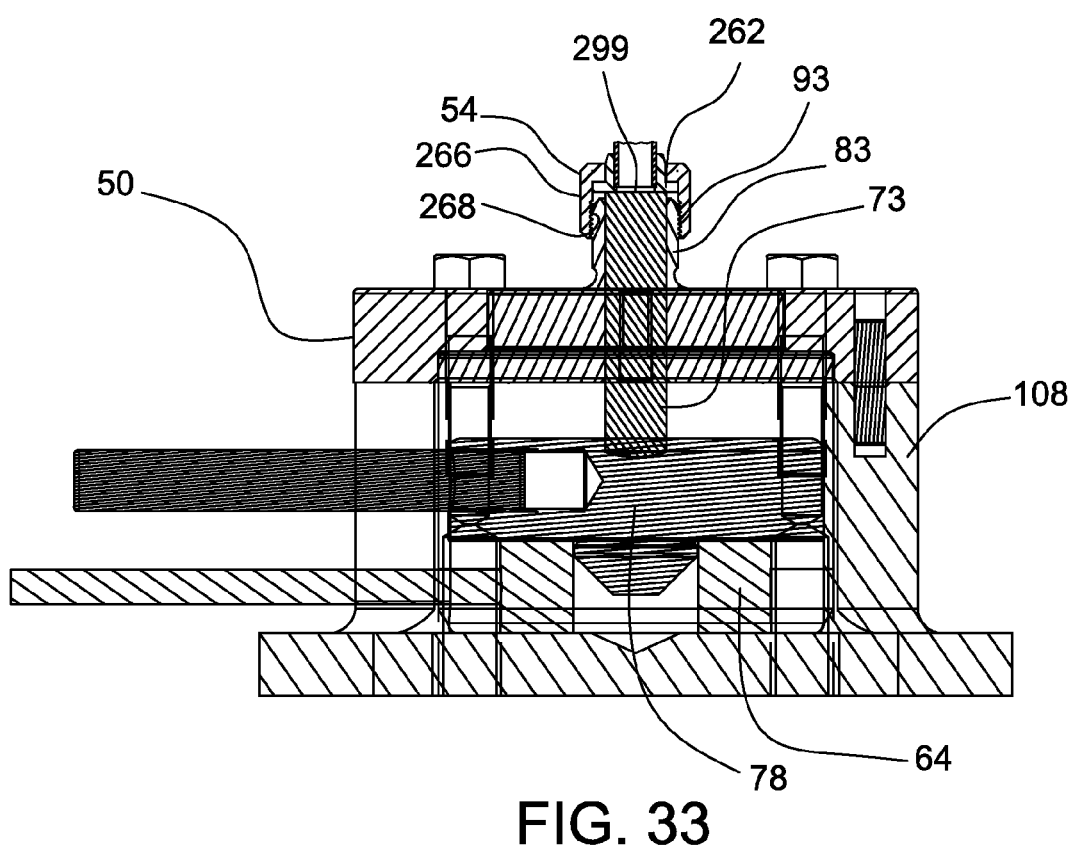
FIG. 33 is an elevational view, in section, of the measuring device of FIG. 2, showing the hydraulic fitting of FIG. 31 mounted thereto.

FIG. 33 shows an example of a hydraulic fitting 54 mounted to a torque coefficient measuring device 50 for testing to determine the torque coefficient K of the hydraulic fitting 54. The internal threaded surface 268 of the swivel nut 266 is mounted to an external threaded surface 93 of the attachment member 83 installed in the housing 108 of the torque coefficient measuring device 50. The flange piece 262 of the hydraulic fitting 54 is in engaging contact with the flat end 229 of the load pin 73 such that a predetermined torque applied to the swivel nut 266 causes the flange piece 262 to exert an axial load against the load pin 73. The load pin 73, in turn, compressively transmits the axial load to the axial load sensor 64 via the load plate 78. The axial load produced by the load pin 73 in response to the torque applied to the swivel nut 266 of the hydraulic fitting 54 is measured and the applied torque value is captured.

Figure 34:
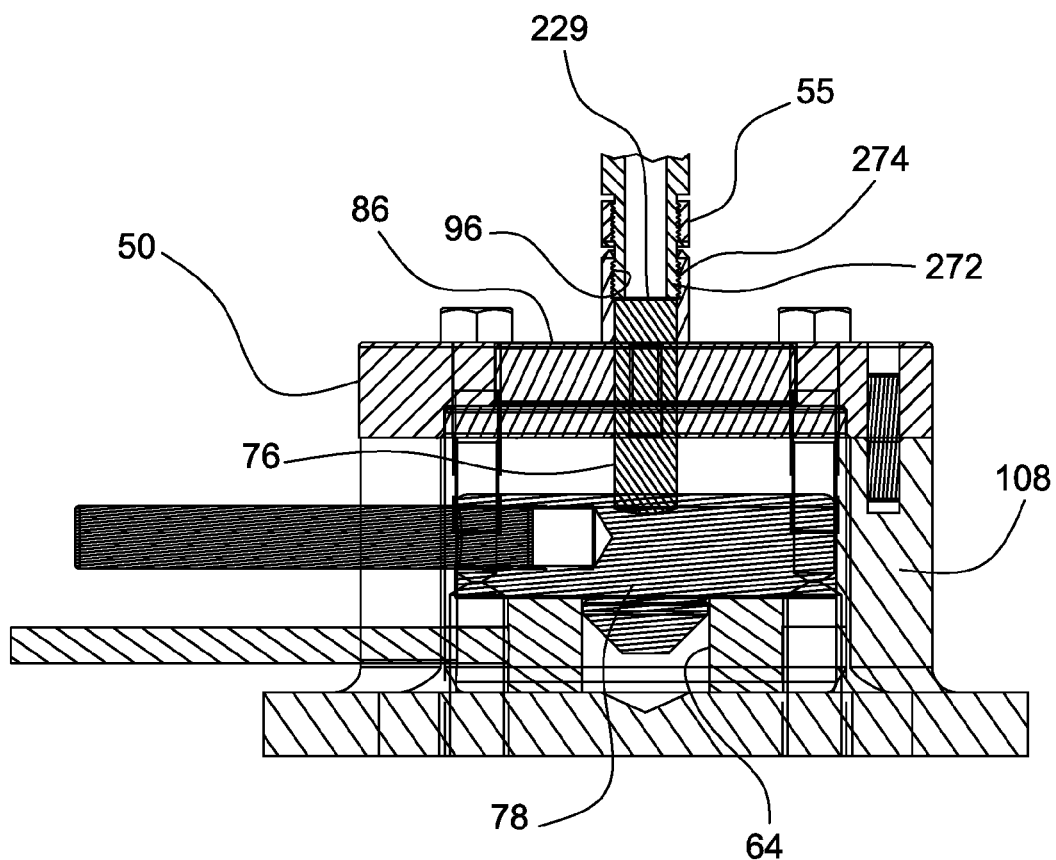
FIG. 34 is an elevational view, in section, of an embodiment of a measuring device in accordance with the disclosed principles, which is similar to the measuring device of FIG. 1 but with an attachment member having an internal threaded surface, and showing the hydraulic adaptor of FIG. 32 mounted thereto.

FIG. 34 shows an example of a hydraulic adaptor 55 mounted to a torque coefficient measuring device 50 for testing to determine the torque coefficient K of the hydraulic adaptor 55. The external threaded surface 274 of the stud end 272 of the hydraulic adaptor 55 is mounted to an internal threaded surface 96 of the attachment member 86 installed in the housing 108 of the torque coefficient measuring device 50. The stud end 272 of the hydraulic adaptor 55 is in engaging contact with the flat end 229 of the load pin 76 such that a predetermined torque applied to the hydraulic adaptor 55 causes the stud end 272 to exert an axial load against the load pin 76. The load pin 76, in turn, compressively transmits the axial load to the axial load sensor 64 via the load plate 78. The axial load produced by the load pin 76 in response to the torque applied to the hydraulic adaptor 55 is measured, and the applied torque value is determined.

A torque coefficient measuring device 50 constructed in accordance with the present disclosure can be used to obtain a direct measurement of the axial load produced by torque on a coupling or other threaded fitting in order to measure the torque coefficient. In one embodiment, a method for measuring an axial load produced by a torque applied to a threaded component uses a test fixture with a load pin to transfer the axial load from an applied torque to a measuring device to measure the axial load. Using the known applied torque and threaded component dimensions and the measured axial load, the torque coefficient K is calculated using the equation:

$$K=T/(D\times W)$$

where:
K=Torque Coefficient,
T=Torque applied to the test piece,
D=Nominal Thread Diameter of the threaded component being tested, and
W=Axial load measured at the applied Torque value.

In another method for measuring an axial load produced by a torque applied to a threaded component, the threaded component is threadedly engaged with a threaded surface of an attachment member such that the threaded component is in axially aligned and engaging relationship with a load pin. A torque is applied to the threaded component such that the threaded component exerts an axial load against the load pin. The load pin, in turn, compressively transmits the axial load to an axial load sensor. The axial load produced by the load pin in response to the torque applied to the threaded component is measured and the applied torque value is captured. The torque coefficient K is calculated using the equation: $K=T/(D\times W)$ as described above. Should it be desired to test a threaded component of a different size, the attachment member can be replaced with a second attachment member from a set of interchangeable attachment members suitably sized for threadingly securing the threaded component which is desired to be tested. A corresponding load pin can be selected from a set of load pins which is suitably sized for the particular threaded component being tested.

In another embodiment of a method for measuring an axial load produced by a torque applied to a threaded component, the threaded component is mounted to a fixture having a movable load pin housed therein. A torque is applied to the mounted threaded component such that the torque applied to the mounted threaded component produces an axial load upon the load pin. The load pin transfers the axial load to a measuring device housed within the fixture. The torque coefficient K is calculated using the equation: $K=T/(D\times W)$ as described above.

INDUSTRIAL APPLICABILITY

The industrial applicability of the embodiments of a torque coefficient measuring device described herein will be readily appreciated from the foregoing discussion. Using a measuring device in accordance with the present disclosure, a torque can be applied to a fitting and/or coupling which is threadingly mounted to a thread detail plate of the device, which in turn applies axial force to a load pin. The load pin transmits the axial load to a load plate 78 which in response compresses a load washer. The measuring device provides a means for directly measuring the axial force created by the applied torque. Accordingly, the need for surrogate bolt plating and measurement can be eliminated in instances where the component to be tested would be too small for a conventional measuring device. The measuring device in accordance with the present disclosure can allow for the inspection of production components throughout the chain from supplier to end user using a common inspection process at all locations.

For example, a measuring device in accordance with the present disclosure can be used for incoming supplier material inspection and by end users to verify compliance with design specifications. The torque coefficient measuring device can be used to measure the torque coefficient of fluid-carrying fittings and hose couplings used in machines, such as those manufactured by Caterpillar Inc. of Peoria, Illinois, for example. A torque coefficient measuring device in accordance with the present disclosure can also be used by any manufacturer of these components to ensure process control and finished component conformance of these plated components.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. An apparatus for measuring an axial load produced by a torque applied to a threaded component, the apparatus comprising:
a base defining a chamber therein;
a load sensor disposed within the chamber of the base;
a movable load pin housed within the base and arranged such that an axial load placed upon the load pin is transmitted to the load sensor;
an attachment member adapted to be connected with the threaded component, the attachment member operably arranged with the load pin such that a torque applied to a threaded component mounted to the attachment member places an axial load upon the load pin.

2. The apparatus of claim 1, wherein the base includes a vise adaptor including a rib projecting therefrom.

3. The apparatus of claim 1, wherein the base includes a housing having a mounting flange.

4. The apparatus of claim 1, further comprising:
a load plate disposed between the load pin and the load sensor.

5. The apparatus of claim 4, wherein the load sensor comprises an annular load washer defining a central opening therein, and the load plate includes a centrally-disposed projection adapted to fit within the central opening of the load washer.

6. The apparatus of claim 4, wherein the base includes a housing having a sidewall defining a slot therein, and the load plate includes a lift pin projecting therefrom, the lift pin extending from the chamber through the slot of the sidewall of the housing.

7. The apparatus of claim 6, wherein the base includes a top plate, the housing includes a top plate support surface adapted to support the top plate and a load sensor support surface within the chamber and adapted to support the load sensor thereon, the load plate includes a load pin surface in opposing relationship to a load sensor surface, the load pin surface is adapted to support the load pin, the load sensor surface is adapted to engagingly contact the load sensor upon which the load sensor surface rests, and wherein the top plate support surface, the load sensor support surface, the load pin surface, and the load sensor surface are each ground to within a 50 micron flatness.

8. The apparatus of claim 1, wherein the base includes a bottom end and a top end, the base including a top plate disposed adjacent the top end thereof, the top plate including a central opening therethrough, the top plate including an interior surface and an opposing exterior surface, the interior surface defining at least in part the chamber, the attachment member extending from the interior surface through the central opening of the top plate, the attachment member in inter-engaging relationship with the interior surface of the top plate such that the attachment member is constrained from moving in a direction from the interior surface to the exterior surface of the top plate.

9. The apparatus of claim 8, wherein the base includes a housing having a support surface adapted to support the top plate, the support surface defining a bore extending a predetermined distance therefrom, the top plate including a mating surface adapted to mate with the support surface of the housing, the mating surface having a pin extending therefrom, the pin adapted to fit within the bore of the housing.

10. The apparatus of claim 8, wherein the attachment member includes a projecting portion extending from the base, the projecting portion having an external threaded surface adapted to threadingly engage the threaded component.

11. The apparatus of claim 8, wherein a pair of pins projects from the interior surface of the top plate, and the attachment member includes a pair of passages adapted to respectively receive one of the pins therein to prevent relative rotation between the top plate and the attachment member.

12. The apparatus of claim 11, wherein the base includes a housing having a support surface adapted to support the top plate, the support surface defining a bore extending a predetermined distance therefrom, the top plate including a mating surface adapted to mate with the support surface of the housing, the mating surface having a pin extending therefrom, the pin adapted to fit within the bore of the housing.

13. The apparatus of claim 1, wherein the attachment member includes an axial passage therethrough, at least a portion of the load pin disposed within the axial passage.

14. The apparatus of claim 13, wherein the axial passage of the attachment member includes a threaded surface adapted to threadingly engage the threaded component.

15. The apparatus of claim 1, wherein the attachment member includes a projecting portion having an external threaded surface adapted to threadingly engage the threaded component.

16. The apparatus of claim 1, wherein the attachment member comprises a first type adapted to be connected with a threaded component of a first size, the apparatus further comprising:
an attachment member comprising a second type adapted to be connected with a second threaded component of a second size, the second size being different than the first size, wherein the attachment member of the first type and the attachment member of the second type are adapted to be interchangeably supported by the base.

17. The apparatus of claim 16, wherein the load pin comprises a first type adapted for use with the attachment member of the first type, the apparatus further comprising:
a movable load pin comprising a second type adapted to be housed within the base, interchangeably with respect to the load pin of the first type, and arranged with respect to the second threaded component such that an axial load placed upon the load pin of the second type is transmitted to the load sensor.

18. A method for measuring an axial load produced by a torque applied to a threaded component, the method comprising:
threadingly engaging a threaded component with a threaded surface of an attachment member such that the threaded component is in axially aligned and engaging relationship with a load pin;
applying a torque to the threaded component such that the threaded component exerts an axial load against the load pin, the load pin compressively transmitting the axial load to an axial load sensor;
measuring the axial load produced by the load pin in response to the torque applied to the threaded component.

19. The method of claim 18, wherein the load pin compressively transmits the axial load to the axial load sensor via a load plate, the load plate being disposed between the load pin and the axial load sensor.

20. A method for measuring an axial load produced by a torque applied to a threaded component, the method comprising:
mounting the threaded component to a fixture having a movable load pin housed therein;
applying a torque to the mounted threaded component such that the torque applied to the mounted threaded component produces an axial load upon the load pin, and the load pin transfers the axial load to a measuring device housed within the fixture.

* * * * *